(12) United States Patent
Halpern et al.

(10) Patent No.: US 6,438,100 B1
(45) Date of Patent: Aug. 20, 2002

(54) METHOD AND APPARATUS FOR ROUTING SERVER REDUNDANCY IN A NETWORK HAVING CARRIER SCALE INTERNETWORKING

(75) Inventors: Joel M. Halpern, Leesburg, VA (US); Zdenek Becka, Washington, DC (US); Wan Chen, Chevy Chase, MD (US)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/368,752

(22) Filed: Aug. 5, 1999

Related U.S. Application Data
(60) Provisional application No. 60/095,752, filed on Aug. 7, 1998.

(51) Int. Cl.[7] .................. H04L 12/28; H04L 12/46; H04L 12/56
(52) U.S. Cl. .................. 370/218; 370/254; 370/397; 370/401; 370/428; 709/203; 709/238; 709/249; 709/252
(58) Field of Search .................. 370/216, 217, 370/218, 254, 255, 256, 389, 395.1, 396, 397, 400, 401, 409, 428, 429; 709/201, 202, 203, 220, 221, 238, 249, 252; 714/1, 2, 3, 4

(56) References Cited

U.S. PATENT DOCUMENTS

| | | | | |
|---|---|---|---|---|
| 5,600,644 A | * | 2/1997 | Chang et al. | 370/404 |
| 5,870,454 A | * | 2/1999 | Dahlen | 379/88.14 |
| 5,951,649 A | * | 9/1999 | Dobbins et al. | 709/238 |
| 6,005,864 A | * | 12/1999 | Krause | 370/395 |
| 6,229,813 B1 | * | 5/2001 | Buchko et al. | 370/412 |
| 6,335,926 B1 | * | 1/2002 | Silton et al. | 370/351 |

* cited by examiner

*Primary Examiner*—Alpus H. Hsu (57) ABSTRACT

A method and apparatus provides greater flexibility, scalability and manageability when multiple services are being supported by a Carrier Scale Internetworking (CSI) system by including processing that detects when connectivity to an Route Server Instance (RSI) host that is supporting an active RSI has failed and provides a replacement RSI host from a redundancy set. In additional, forwarders (i.e., core forwarder, edge forwarder, and/or default forwarder), upon detecting a change in the RSI host, connect to the new RSI host. RSI hosts in the redundancy set use a redundancy chain protocol to select the new RSI host to function as the active RSI. Note that an RSI host may be a virtual entity on a routing service control point (RSCP) that indicates that this RSI Host has the capability to become an active RSI, wherein an active RSI is an RSI Host that is running the RSI.

32 Claims, 8 Drawing Sheets

METHOD AND APPARATUS FOR ROUTING SERVER REDUNDANCY IN A NETWORK HAVING CARRIER SCALE INTERNETWORKING

This application claims benefit to U.S. application Ser. No. 60/095,752, filed Aug. 7, 1998.

TECHNICAL FIELD OF THE INVENTION

The present invention relates generally to networks and in particular to routing server redundancy in a network having carrier scale internetworking.

BACKGROUND OF THE INVENTION

Telecommunication is known to allow one or more calling parties to convey data to one or more called parties. The data conveyed may be voice, video data, and/or computer data. Computer data includes e-mail communications, file transfers, file sharing, etc. To enable such communication, a calling party transmits an identifying code (e.g., phone number) of at least one called party to a local exchange carrier (LEC), which is typically operated by a local phone company, or to an inter-network exchange carrier (IEC), which is typically operated by a long distance phone company. The receiving exchange carrier interprets the identifying code of the called party and determines whether it can complete the communication path between the called and calling parties (e.g., the call is a local call). If so, the receiving exchange carrier provides a communication path for the calling party and the called party such that they may participate in a communication.

If, however, the receiving exchange carrier cannot complete the communication path, it transfers the called party's identifying code to another local exchange carrier and/or to an inter-network exchange carrier. The called party's identifying code is continually passed until it reaches a local exchange carrier, or an inter-network exchange carrier, that can complete the communication path.

As is known, local exchange carriers and inter-network exchange carriers each processes hundreds, thousands, and even tens of thousands of calls at any given moment. To facilitate such a vast number of communications, each of the LECs and IECs includes switching equipment that multiplexes the plurality of communications for more efficient processing. A common multiplexing method for North American Public Data/Telephony Network is to multiplex a line as a DS3 line, which includes 28 DS1 lines, where each DS1 includes 24 DS0 lines. As is known, a DS0 line support 64 Kbps or 56 Kbps of data, depending on its selected configuration. Since a DS1 line supports 24 DS0 lines, a DS1 has a data bandwidth of 1.536 Mbps (24*64 Kbps). Thus, a DS3 line, which includes 672 DS0s, has a data bandwidth of approximately 43 Mbps (672*64 Kbps). As is also known, DS0 lines may be combined into logical channels (often referred to as streams) depending on a particular customer's needs. For example, a typical individual data consumer (i.e., a home user) would require a single DS0 line, or link. In contrast, a business may require a full DS1, or T1, link thus utilizing the full 1.536 Mbps of bandwidth.

Another multiplexing method, which is primarily used outside of North America, is to configure a line as an E3 line, which includes 16 E1 lines. As is known, an E1 line is comprised of 32 DS0 lines (of which 31 support data) and has a data band width of 1.984 Mbps. Thus, an E3 line includes up to 496 DS0 lines and has data bandwidth of approximately 33 Mbps. The DS0 lines may be assigned to customers based on their data bandwidth requirements in a similar manner as the DS0 lines are allocated for a DS3 line. As such, a consumer may have a logical channel that includes a single DS0 line or up to a complete E1 link.

To ensure cooperation of telephone multiplexing equipment, several data transmission standards have been adopted. One such standard requires data to be transported in accordance with a High-level Data Link Controller (HDLC) encapsulated data protocol. There are several types of HDLC encapsulated data protocols including frame relay, point to point protocol (PPP) and switched multi-megabit data service (SMDS). In essence, the HDLC encapsulated technique allows multiple connections i.e., logical channels) to be carried on a single link, be terminated, and adapted for further transportation using another encapsulating techniques. For example, data that has been packetized based on the frame relay HDLC encapsulated data protocol can be terminated and then converted to another HDLC encapsulated data packetizing protocol (e.g., PPP and/or SMDS) or to other data packetizing protocol such as ATM (asynchronous transfer mode) data packetizing protocol. For example, a frame relay to ATM adaptation technique includes network interworking and service interworking functionality, where service interworking provides two adaptation subcategories: transparent and translation. The conversion of data from one encapsulated data packetizing protocols to another is regulated by several published standards from Belcor, ITU, the frame relay forum, the ATM forum, and the Internet engineering task force.

To facilitate data transportation within the switching equipment, the switching equipment includes a direct memory access (DMA) controller. A typical DMA controller transports data elements from point to point in response to a stimulus from the source or destination point without regard to the data content. More advanced DMA controllers support scattering/gathering of data. As is known, the scattering/gathering technique enables a DMA controller to segment large blocks of data into smaller blocks and to distribute the smaller blocks within a large memory system, achieving more efficient use of the large memory system. A more advanced DMA controller typically implements the scattering/gathering without regard to data content and usually in only one data transfer direction (e.g., to the large memory system or from the large memory system). The more advanced DMA controller may, however, verify that the data is formatted in accordance with a specific data packetizing protocol (e.g., HDLC frame relay encapsulated data protocol) based on the data content, but the transporting of data is still independent of the data content.

To achieve multi-channel processing with a single DMA controller, the DMA circuit resources for a single channel are replicated. When the stimulus is received for a data transfer via a particular logical channel, the circuit resources for the particular logical channel are activated, but the circuitry for the other logical channels remains inactive. As such, the switching equipment is not operating at an optimal level.

To improve the switching equipment's multi-channel performance, the equipment may include a multi-channel DMA controller, which services multiple logical channels as they require data transfers. Controlling such multiple channel data transfers may be done in one of a variety of ways. For example, each channel, or object, in the system may be serviced based on a theoretical average of the overall system requirements. As such, each object obtains a theoretical average value and is processed in accordance with this average. While this method assures that each object will be processed, it, at times, over emphasizes some objects of lesser importance while undervaluing objects of greater importance. An alternate technique assigns a maximum weight for any given object. As such, each object is serviced as though it were of a maximum weight, i.e., priority. In this technique, the condition of all possible objects times maximum weight is theoretically impossible, but to come close to fulfilling this theoretical condition, a substantial amount of memory and supporting circuitry is required, which tends to be wasteful. Another technique allows the object to set its own pace of processing, which is efficient for keeping a given resource busy. However, in a runaway situation, a given object can consume the system, taking more than its fair share and starving other objects from being serviced.

To further improve the efficiency of data transportation between networks and/or components thereof, Carrier Scale Internetworking (CSI) was created. In general, CSI provides a framework for carrying packet-based traffic in a highly flexible, scalable, and manageable way. To achieve CSI, a network includes logical CSI components, such as access terminations and data forwarders, which interoperate to provide routing and forwarding. As is known, routing and forwarding has been traditionally referred to and labeled as "routing". While the CSI system provides improved routing of packet-based traffic, its flexibility, scalability and manageability is limited when multiple services, such as Public Internet service and Virtual Private Network (VPN) service, are being offered.

Therefore, a need exists for a method and apparatus that provides greater flexibility, scalability and manageability when multiple services are being supported by a CSI system.

DETAILED DESCRIPTION OF A PREFERRED EMBODIMENT

Generally, the present invention provides a method and apparatus that provides greater flexibility, scalability and manageability when multiple services are being supported by a Carrier Scale Internetworking (CSI) system. Such a method and apparatus includes processing that detects when connectivity to an Route Server Instance (RSI) host that is supporting an active RSI has failed and provides a replacement RSI host from a redundancy set. In additional, forwarders (i.e., core forwarder, edge forwarder, and/or default forwarder), upon detecting a change in the RSI host, connect to the new RSI host. RSI hosts in the redundancy set use a redundancy chain protocol to select the new RSI host to function as the active RSI. Note that an RSI host may be a virtual entity on a routing service control point (RSCP) that indicates that this RSI Host has the capability to become an active RSI, wherein an active RSI is an RSI Host that is running the RSI.

To achieve the desired CSI redundancy three component interactions occur at one time or another. The three component interactions include RSI Host/Forwarder to Configuration Server (CONS) interaction, RSI Host to RSI Host interaction, and forwarder to RSI Host interaction. The RSI Host/Forwarder to CONS interaction includes retrieving one or more redundancy sets that the RSI Hosts use to determine the Active RSI and the forwarders use to find the Active RSI. Note that Redundancy Sets may be configured manually on the RSI Hosts and/or Forwarders, thus the CONS may be omitted. The use of CONS, however, simplifies the management of the CSI Redundancy mechanism. The RSI Host to RSI Host interaction occurs via a logical router control protocol (LRCP) between RSI Hosts. As such, all RSI hosts within a given redundancy set provide redundancy for one and only one RSI. An RSI Host may participate as a spare in multiple redundancy sets, but once it has been selected to be the active RSI for a redundancy set, it is prevented from participating as a spare for the other redundancy sets. Forwarder to RSI Host interaction involves communication between the Forwarder and the RSI Hosts in the redundancy set to find the currently active RSI.

Figure 1:
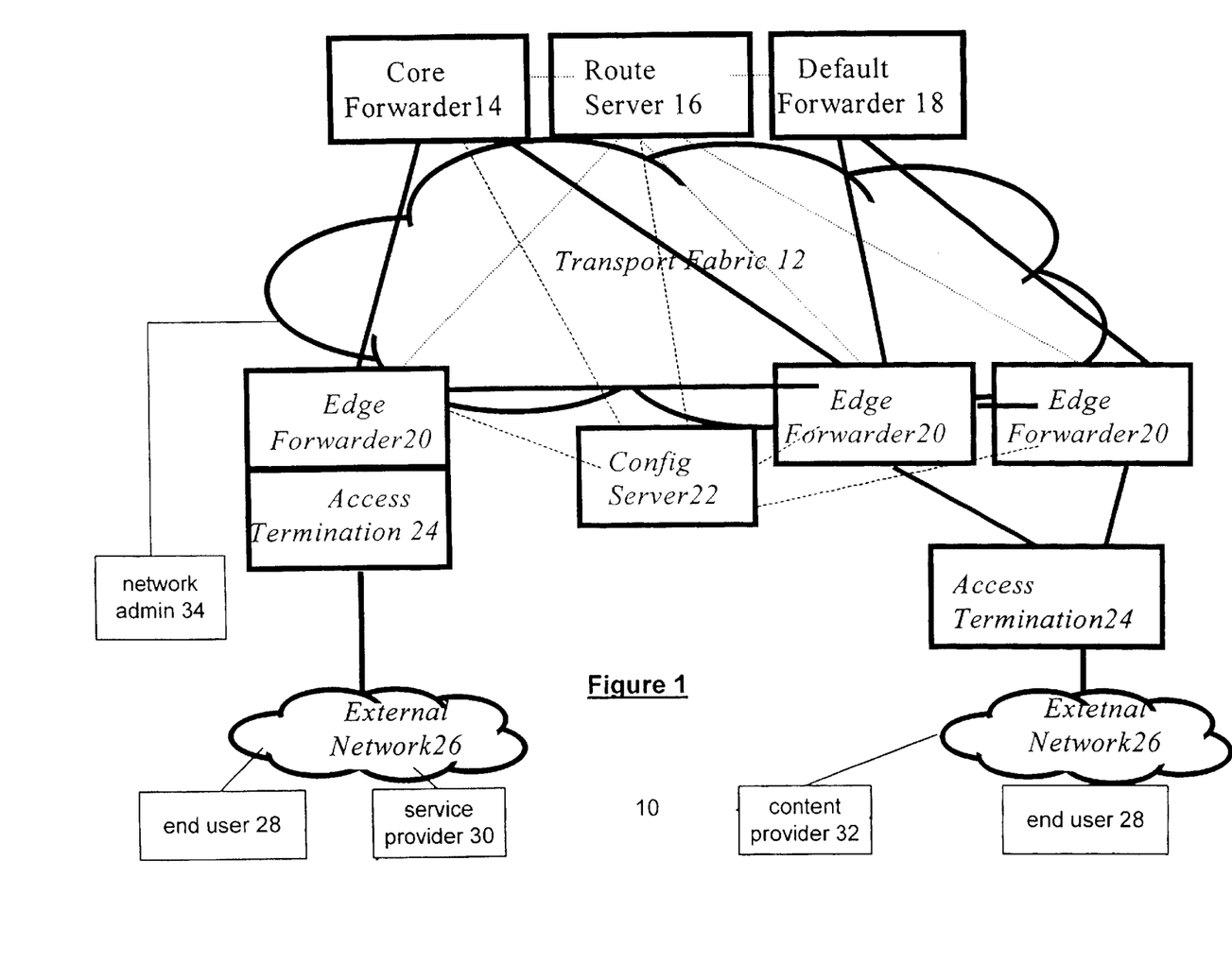
FIG. 1 illustrates a schematic block diagram of a communication environment in accordance with the present invention.

The present invention can be more fully described with reference to FIGS. 1 through 8. FIG. 1 illustrates a communication environment 10 that includes a transparent fabric 12, at least one core forwarder 14, at least one routing services engine 16, at least one default forwarder 18, a plurality of edge forwarders 20, at least one S configuration server (CONS) 22, a plurality of access terminations 24, at least one external network 26, a plurality of end-users 28, at least one service provider 30, at least one content provider 32, and at least one administrative processor 34. Such a communication environment 10 may utilizes Carrier Scale Internetworking (CSI) to provide internetworking (bridging and routing) services. CSI provides services having at least some of the following properties: public and private internet services, private bridged services, customer isolation, customer-specific differentiated service for both configured and dynamically detected flows, reduction of relative complexity of management, modularity of functions, such that the CSI system works together as a whole, but functions can be replaced individually with constrained impact, explicit support for network engineering, coexistence with other services running on the underlying fabric, a high number of customer connection points, independence from the number of simultaneous flows, high availability, and high stability, including routing.

Each of the CSI components (e.g., the core forwarder 14, the routing services engine 16, the default forwarder 18, edge forwarders 20, configuration server (CONS) 22, and access terminations 24) may be implemented as a logical engine that includes a processing module and memory. The processing module may be a single processing device or a plurality of processing devices. Such a processing device may be a microprocessor, microcomputer, microcontroller, digital signal processor, central processing unit, state machine, logic circuitry, and/or any device that manipulates signals (analog or digital) based on operational instructions. The memory may be a single memory device or a plurality of memory devices. Such a memory device may be a read only memory, random access memory, magnetic tape memory, floppy disk memory, hard disk memory, DVD memory, CD memory, and/or any device that stores the operational and/or programming instructions. Note that if the processing module implements one or more functions via a state machine or logic circuitry, the memory containing the corresponding operational instructions would be embedded in the circuitry comprising the state machine and/or logic circuitry. The operational instructions stored in the memory and executed by the processing module will be discussed in greater detail with reference to FIGS. 2–8.

Each of the CSI components may be implemented in a single network switch, such as Newbridge Networks Corporation's 36170, 36100, 36135, 36035, and/or 36075 network switch. Alternatively, each of the CSI components may be physically implemented in different network switches, thus providing more distribution of CSI functions. In either case, the interoperation of the CSI components is the same, which, in general, includes the CSI components acting together to provide routing and forwarding, which were traditionally lumped together and labeled "routing". The CSI system separates the functions of path discovery, topology management, and route computation from packet classification, marking, and forwarding and output queue scheduling and management. Within the CSI system, the separation of function enhances flexibility, scalability and manageability. Outside a CSI system, the CSI system appears to behave like one or more conventional routers.

In general, network management exists independently of interactions between CSI components, and CSI interactions do not restrict network management to specific mechanisms. There are a few areas where CSI expects network management to perform some function, and those functions. For example, the use of configuration servers is a deliberate attempt to minimize requirements for direct provisioning of network elements in order to provide service.

The transport fabric 12 of the CSI system may be an ATM network. On an ATM network, the CSI system may coexist with other services that are offered, such as circuit emulation. Alternatively, CSI could be run over other subnetwork layers. In general, the transport fabric 12 should be a high-speed environment in which virtual connections are possible (the subnetwork details are hidden from the CSI components); virtual connections can be set up dynamically; and virtual connections may have quality of service differentiation sufficient to support the desired Internet Protocol Quality of Service (IP QoS) differentiation.

The configuration server 22 of the CSI system receives information from network management regarding which CSI components should communicate with each other and under what conditions. It then provides the other CSI components with the basic configuration information they need to communicate and to establish bindings between interfaces, services and realms. Configuration servers 22 provide configuration services to each component when it becomes operational, and may update that information at any time.

Note that within the CSI system, flow refers to any set of packets that can be clearly distinguished from all the others passing through a forwarding entity, using simple rules. A flow could be, for example, all packets with a specific combination of source address, destination address, and port. It could also be all packets with a certain value in the IPv4 header TOS byte. Further note that within the CSI system an interface is between two entities, not simply the edge of one or the other of them. As such, an interface implies connectivity, if a fabric-level connection does not exist, an interface cannot be established. Still further note that a CSI system's external interfaces are known as access interfaces and are provided at the access terminations 24. By design, CSI can support any access interface that carries IP packets and/or bridged Protocol Data Unit (PDU). These interfaces may be either physical or virtual (e.g. an ATM VCC).

Within the CSI system, CSI offers services via the access interfaces. The services include Public Internet service, which is managed connectivity to the public Internet, and Virtual Private Network (VPN) service. The VPN service is managed connectivity to a virtual private network. A virtual private network may include both virtual LANs (bridged connectivity) and virtual subnetworks (network layer connectivity). A specific instance of a Public Internet or VPN service is known as a realm. Resources (such as bandwidth and address space) and policy (such as routing, forwarding or CoS) are segregated between realms. An access interface may be one of three kinds: routed (IP—internet protocol-only), VLAN (virtual local area network), and VLAN over which routing exchanges may take place. A public internet realm supports only Layer 3 IP capabilities, although access interfaces will support Layer 2 functions as necessary to do so (e.g. Frame Relay functions). An access interface may have more than one IP address associated with it. The CSI framework does not impose any constraints that prevent a public Internet realm from providing advanced Internet forwarding features such as source-based forwarding, MPLS, and differentiated services. There may be multiple VLANs differentiated by protocol family on a given access interface. Different PDUs (protocol data units) from a single end station may be injected into different virtual LANs or virtual subnets. Within a VPN realm, VLANs are interconnected with routed interfaces.

At an edge of a CSI system is the access termination 24, which provides access interfaces. Access terminations 24 act as aggregation and distribution points, collecting traffic from access networks to distribute to one or more edge forwarders 20 across service interfaces, and distributing traffic from one or more edge forwarders 20 to one or more access networks. The distribution of traffic is controlled by network management. Access terminations 24 may provide limited service differentiation through traffic prioritization between interfaces, under the control of network management. Access terminations 24 provide little, if any, filtering or traffic shaping for incoming traffic except that required by layer 2.

The edge forwarders 20 of the CSI system provide functions related to forwarding in the CSI system. While access terminations 24 will distinguish between traffic destined to different edge forwarders 20, edge forwarders 20 are responsible for more complex service differentiation, interworking of CSI and other mechanisms for providing VPN support, and also for some manipulation of packets. Where the control plane of an external protocol family includes authentication, for example with PPP, the edge forwarder 20 will perform preliminary authentication of users, since this may affect the distribution of traffic. Edge forwarders 20 represent the CSI system at the Internet level, for example by responding to IP-based echo requests. Edge forwarders 20 also provide other functions associated with higher layer protocols, such as support for proxy ARP (address resolution protocol) and inverse ARP, and may act as a proxy for some services such as DHCP (dynamic host discovery protocol). They may make use of other resources, such as CSI routing services, to perform these functions.

The edge forwarders 20 are also responsible for forwarding, but not for routing. For routing they depend on the routing services 16. Edge forwarders 20 classify packets according to realm and quality of service, mark and manipulate packets, and provide differential policing and scheduling for flows, all according to instructions from routing services. The complexity of the information and instructions which edge forwarders 20 receive from routing services 16 is not limited by the framework. Edge forwarders 20 may also detect flows and, with the help of routing services 16, create "shortcut" VCCs to other forwarders when appropriate. Note that the access termination 24 and edge forwarder 20 may be considered as a unit, collectively known as a service point. In some implementations the two logic engines may be tightly coupled. Even if they are combined, they are logically distinct. If they are separate, an access termination 24 may establish relationships with physically distant edge forwarders 20.

The core forwarder 14 of the CSI system is a low overhead, low functionality, possibly high speed, internet-layer forwarding device in the core of the CSI network. Core forwarders 14 are not necessary to the functioning of a CSI system, but are provided to support scalability (by making it possible to reduce the number of Virtual Channel Connections (VCCs) between edge forwarders 20 and by offering a forwarding path for forwarders 20 that cannot hold full forwarding databases). A core forwarder 14 has no service interfaces and runs no routing protocols. It receives instructions from routing services and provides transport within a single realm. As much as possible, special capabilities are implemented in other forwarders, thus allowing the core forwarder 14 to support high speed and high capacity without high overhead. Although some end-to-end features require support in all forwarders (e.g. QoS differentiation), in the core forwarder 14 speed and capacity are far more important than feature richness.

The default forwarder 18 provides support for realms that may require detailed per-flow-forwarding policy. In realms that are smaller in scale it is both possible and attractive not to give edge forwarders 20 pre-loaded complete forwarding information for all the situations they may be required to deal with, and instead to have them ask for that information as needed and cache it. Rather than drop packets while they are retrieving this information, edge forwarders 20 may forward them to the default forwarder. The default forwarder is more sophisticated than a core forwarder 14, in that it takes policy information into account when deciding how to forward. However, like a core forwarder it runs no routing protocols and has no service interfaces. For robustness the default forwarder 18 function has intimate knowledge of routing services policy.

In CSI system, the functions of routing are explicitly separated from the functions of forwarding. The routing services 16 are responsible for routing, are not in any user data path, and are not responsible for forwarding any user data. The routing services engine 16 provides the routing services via routing service control points (RSCPs). RSCPs present one or more routing services instances (RSIs). RSIs are the means by which routing services communicates with a particular realm. CSI forwarders establish associations with one or more RSIs on one or more RSCPs. The RSIs are responsible for exchanges of routing information with peers both inside and outside a CSI realm. RSIs take in routing information from other routing entities, other RSIs, and from forwarders (regarding connectivity to other forwarders and external entities). They calculate routing information for each forwarder for which they are responsible and distribute the results to the forwarders. They also distribute related configuration information such as interface bindings. Route distribution may be done in advance or on demand. A realm may have more than one RSI operating in it for scaling purposes. The CSI components that interact closely with routing services, i.e. the CONS 22 and the default forwarder 18, may be bundled with routing services in an implementation, just as edge forwarders and access terminations may be combined. Logically they are best considered as separate regardless.

The CSI components interact as management interfaces, configuration interfaces, control interfaces, service interfaces, and transport interfaces. Management interfaces carry interactions between network management and CSI components. Configuration interfaces carry configuration information between configuration services and other CSI components except access terminations 24. Configuration services do not interact with access terminations—if forwarder components are separate from the edge access terminations, the access termination configuration is done through network management. Control interfaces carry control information between an RSI and the forwarders associated with it. From the RSI they carry information regarding service interfaces such as IP addresses and applicable forwarding policies. From forwarders to RSIs they carry information on connectivity between forwarders and also between forwarders and external entities. Service interfaces carry user traffic between access terminations and edge forwarders in cases where the two functions are separated. An access termination 24 may map multiple access interfaces to a single service interface. Transport interfaces carry user information between forwarders. Traffic with different QoS requirements may be carried in different VCCs. Within a single realm and a single QoS, multipoint-to-point VCCs may be used to reduce the number of VCCs a forwarder must support.

Except for management interfaces, all interfaces are based on ATM VCCs. Within a VCC, AAL5 (ATM adaptation layer 5) is used, and all packets are encapsulated using the LLC (logical link control) part of RFC 1483 for ATM. QoS parameters depend on the specific use of the VCC. Signaling requires explicit QoS parameter signaling in addition to UNI 3.1 semantics. For configuration, control, and transport interfaces, SVCs (switched virtual circuits) are used, for robustness and manageability. Information elements are used to carry SVC attributes such as its purpose (e.g. management). Control interface SVCs are "persistent", i.e. if SVC connectivity is lost the CSI components will reestablish the SVC immediately. Transport interfaces which are created based on preconfigured information from the RSI are persistent, while transport SVCs which are created due to flow detection are not expected to be persistent, and are released if inactive. Note that either side of an interface may attempt to establish the underlying connection if needed. Duplicate connections are dealt with through simple conventions. In cases where an interface relationship is asymmetric, it is up to the client component to establish the association. Where it is symmetric, both components try to establish the association.

TABLE 1

Interfaces between CSI Components. x: configuration. s: service. p: persistant transport. d: dynamic transport. c: control.

|        | AT 24 | Cons 22 | RS 16 | EF 20 | CF 14 | DF 18 |
|--------|-------|---------|-------|-------|-------|-------|
| AT 24  |       |         |       | s     |       |       |
| Cons 22|       |         | x     | x     | x     |       |
| RS 16  |       |         |       | c     | c     | c     |
| EF 20  |       |         |       | pd    | pd    | p     |
| CF 14  |       |         |       |       |       | pd    |
| DF 18  |       |         |       |       |       | p     |

Table 1 shows the possible interfaces between the components of the CSI network. "Persistent transport" refers to transport SVCs that are established at startup and are maintained. "Dynamic transport" refers to transport SVCs that are established when a forwarder believes them to be appropriate, and which are taken down when they are idle.

In general, the CSI components are given an ATM any-cast address that they can use to discover an appropriate configuration server (CONS) 22. When a CSI component is first initialized, it registers with a CONS 22 as its client. The CONS 22 keeps state information for each of its clients, and will update them upon any configuration changes they need to be aware of for their proper functioning. Since ATM any-cast addresses are used to establish persistent SVCs, in the case of SVC failure it is possible that the new connection will be established with a different CONS 22.

At initialization, each individual RSCP registers with a CONS 22, and in the ensuing dialog receives information it needs for its operation. This information includes the RSIs to be running on the RSCP, the CSI realms for which the RSIs are responsible, any RSCP redundancy information, and the control interfaces that it should establish with other RSIs and external entities. It also includes detailed information that the RSI will need to manage the forwarders that register with it.

An edge forwarder 20 registers with a CONS 22 and is given a list of RSCPs supporting the RSIs it should register with, along with the QoS parameters to use when contacting the RSIs. The CONS 22 also has RSCPs as clients. If it detects addition, deletion, and/or failure of relevant RSCPs, it will notify the edge forwarder 20 of the changes. If an edge forwarder 20 is unable to maintain an interface with a particular RSI, it will notify the CONS 22. Core forwarder 14 configuration is very much like that of an edge forwarder 20, except that a core forwarder 14 does not require information specific to access interfaces (such as point-to-point protocol (PPP) authorization information). Default forwarders 18 rely on close association with an RSI for their information.

After a forwarder has received information from configuration services, it establishes an association with each of its RSIs, and register with each as a client. An edge forwarder 20 then learns the realms being served by each RSI and detailed information about the external interfaces it is to support for each realm, such as subnet/VLAN configuration.

The RSIs use routing information from internal and external peers, information received from forwarders about links to other forwarders (in public internet realms), and policy information from network management, to compute forwarding rules for each forwarder in the CSI system for which they are responsible. They then provide this forwarding information to the forwarders as required. The information transmitted to a forwarder may include instructions regarding persistent links that the forwarder shall establish with other forwarders. As a forwarder establishes and loses such links with other forwarders, it keeps its RSIs notified of the changes. RSIs are not notified of temporary shortcuts established due to flow detection. RSIs give instructions to forwarders that may include a wide range of rules, based on everything from incoming interface to source address or requested services. If a forwarder loses its control interface with an RSI, and is not able to reestablish it within a short time, it should flush any information it obtained from that RSI and report the loss to configuration services 22.

RSIs are also responsible for computing multicast forwarding rules for the forwarders. Multicast within bridged realms is managed following the usual mechanisms for VLANs. Multicast join and leave requests which are received from outside the CSI system are propagated from the forwarders to the RSIs, which then distribute the appropriate forwarding rules in response.

The differences in what an edge forwarder receives from an RSI and what other forwarders receive from an RSI is similar to the differences in what forwarders receive from configuration services. Core forwarders need information on interfaces to establish with other forwarders, but do not need external interface information. Core forwarders report connectivity in a similar manner as the edge forwarders. Default forwarders need highly detailed policy information.

RSIs communicate with each other for several control purposes, depending on the relationship between the RSCPs. Between RSIs and routing entities outside of the RSIs' realms, RSIs use either internal or external routing protocols to exchange routing information, and NHRP to support the creation of shortcut transport connections. Edge forwarders mediate this communication. Within a public Internet realm, they use iBGP4 (border gateway protocol) and NHRP (next hop resolution protocol), and an IGP (interior gateway protocol). An iBGP attribute is used to distribute the IP address of the egress edge forwarder for external destinations. They also use a realm topology management protocol to communicate realm topology information received from forwarders. NHRP between RSIs includes support for IP QoS. Within a VPN realm, they communicate using an IGP and NHRP.

Edge forwarders 20 establish connections with other forwarders for two reasons. First, if instructed to do so, and second, if a flow is detected and the edge forwarder considers a direct "shortcut" connection to be appropriate. Based on forwarding policies received from RSIs, edge forwarders 20 forward IP packets as required on their transport and service interfaces. The forwarding function includes IP control functions such as generation of ICMP messages for external peers, and source verification. Default forwarders forward packets based on their intimate knowledge of RSI policy. Since a particular traffic flow through a default forwarder can be expected to be temporary, lasting only until the source forwarder establishes a direct transport connection, default forwarders never attempt to form shortcut connections. Core forwarders establish connections and forward packets per RSI instructions. Core forwarders 14 would rarely, if ever, be the target of an on-demand connection. In a CSI system where core forwarders 14 were deployed, the scale of the traffic would likely be such that connections to core forwarders 14 would be preconfigured.

Figure 2:
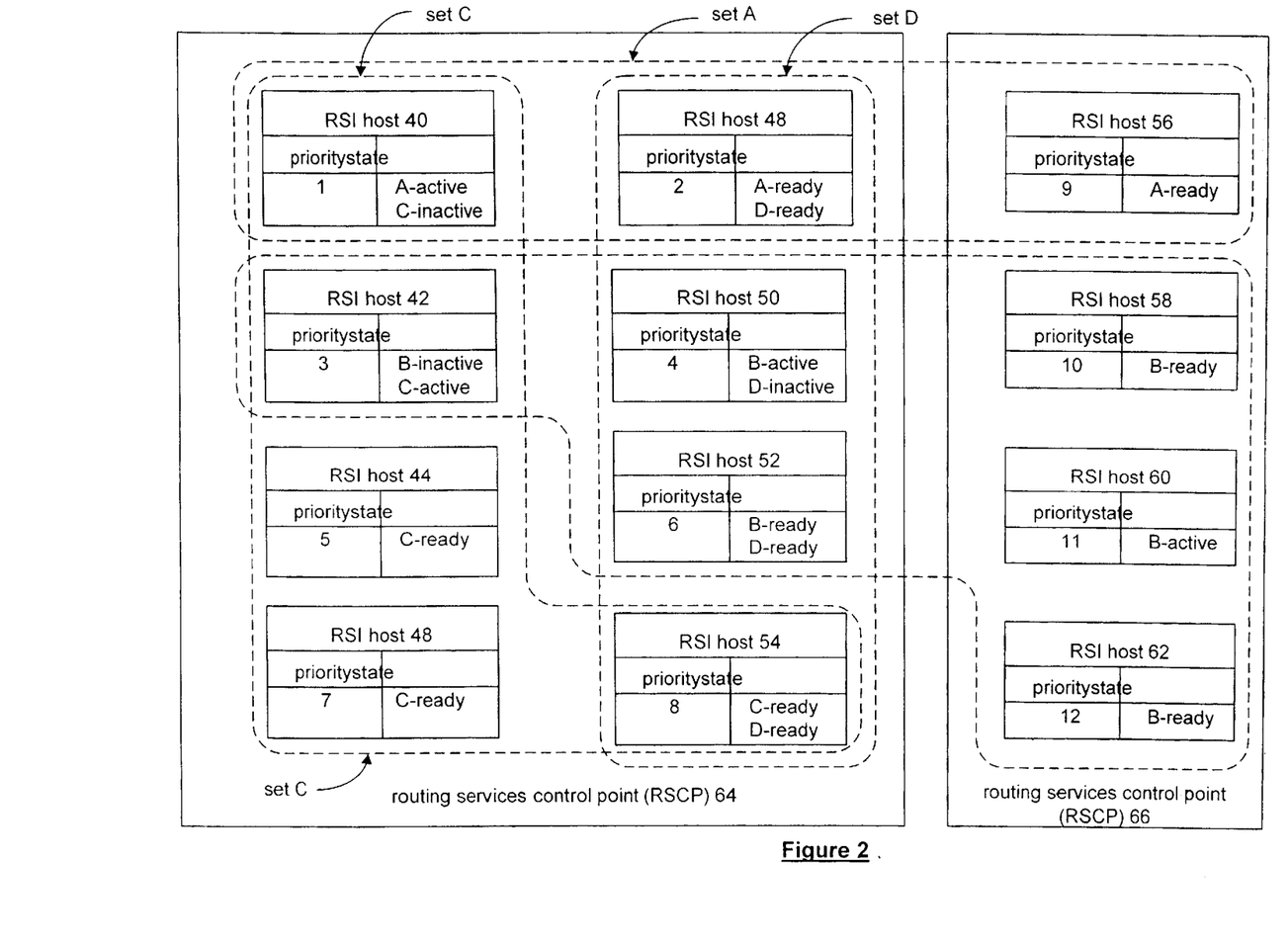
FIG. 2 illustrates a logical representation of routing services control points in accordance with the present invention.
Figure 3:
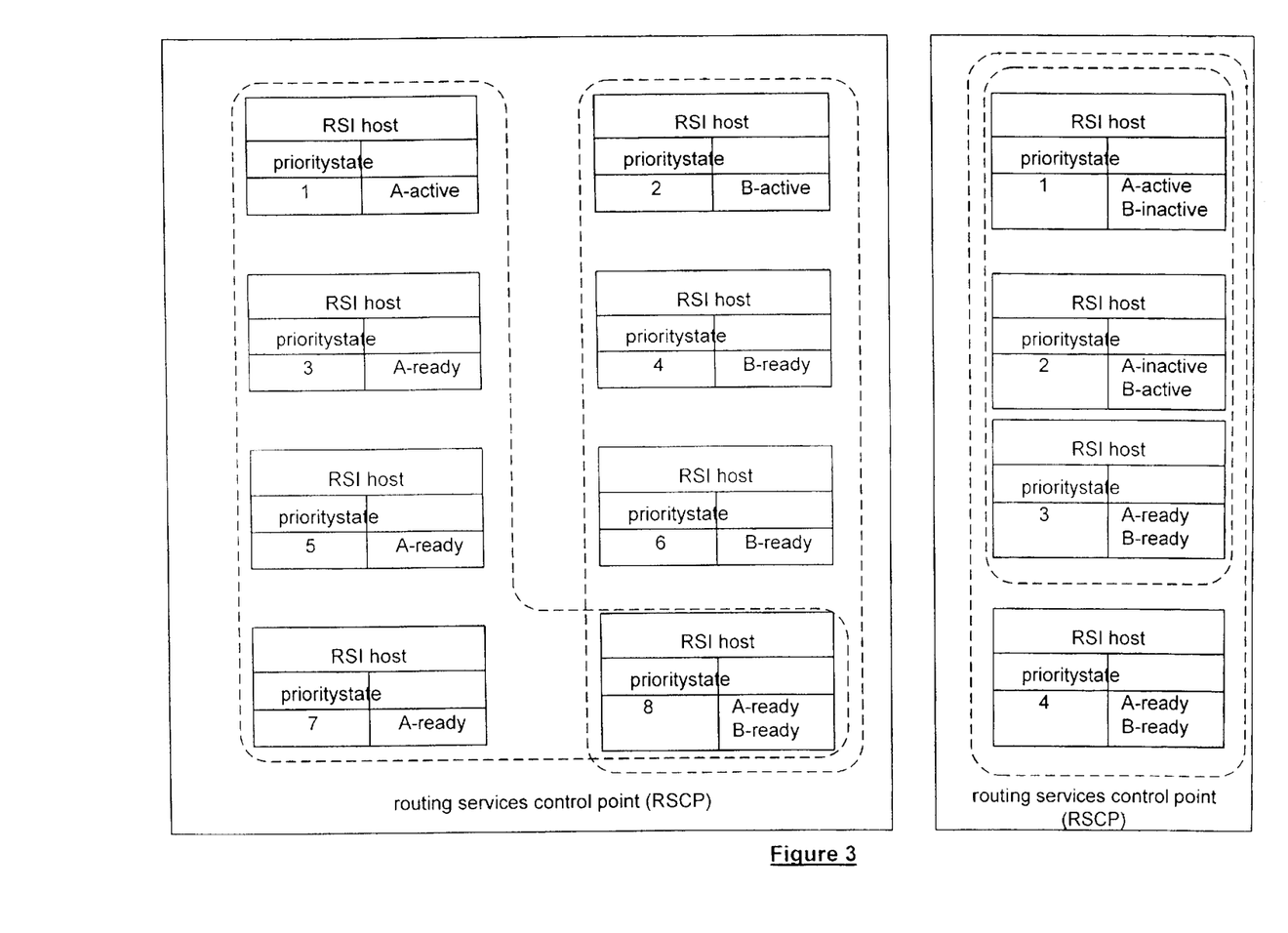
FIG. 3 illustrates a logical representation of an alternate routing services control points in accordance with the present invention.
Figure 4:
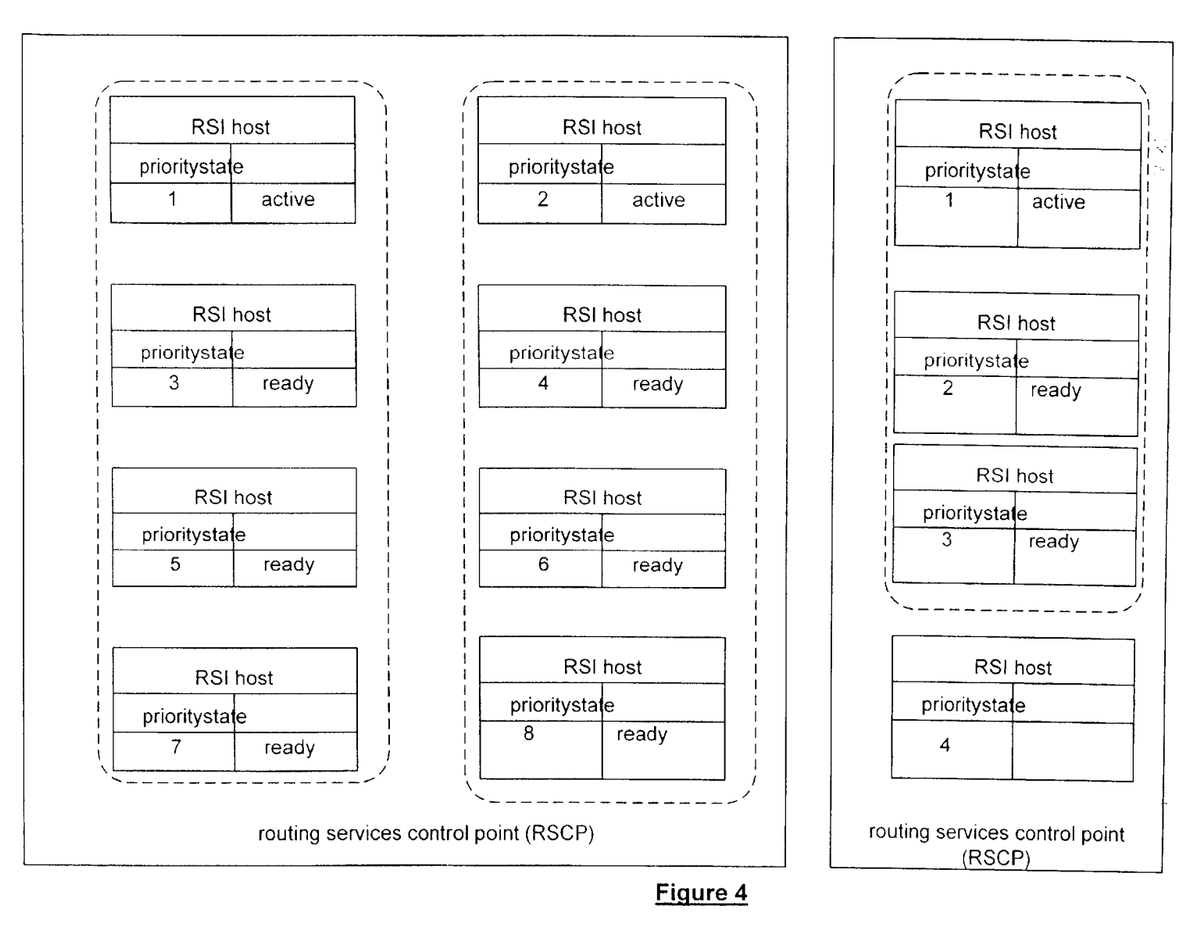
FIG. 4 illustrates a logical representation of another alternate routing services control points in accordance with the present invention.
Figure 5:
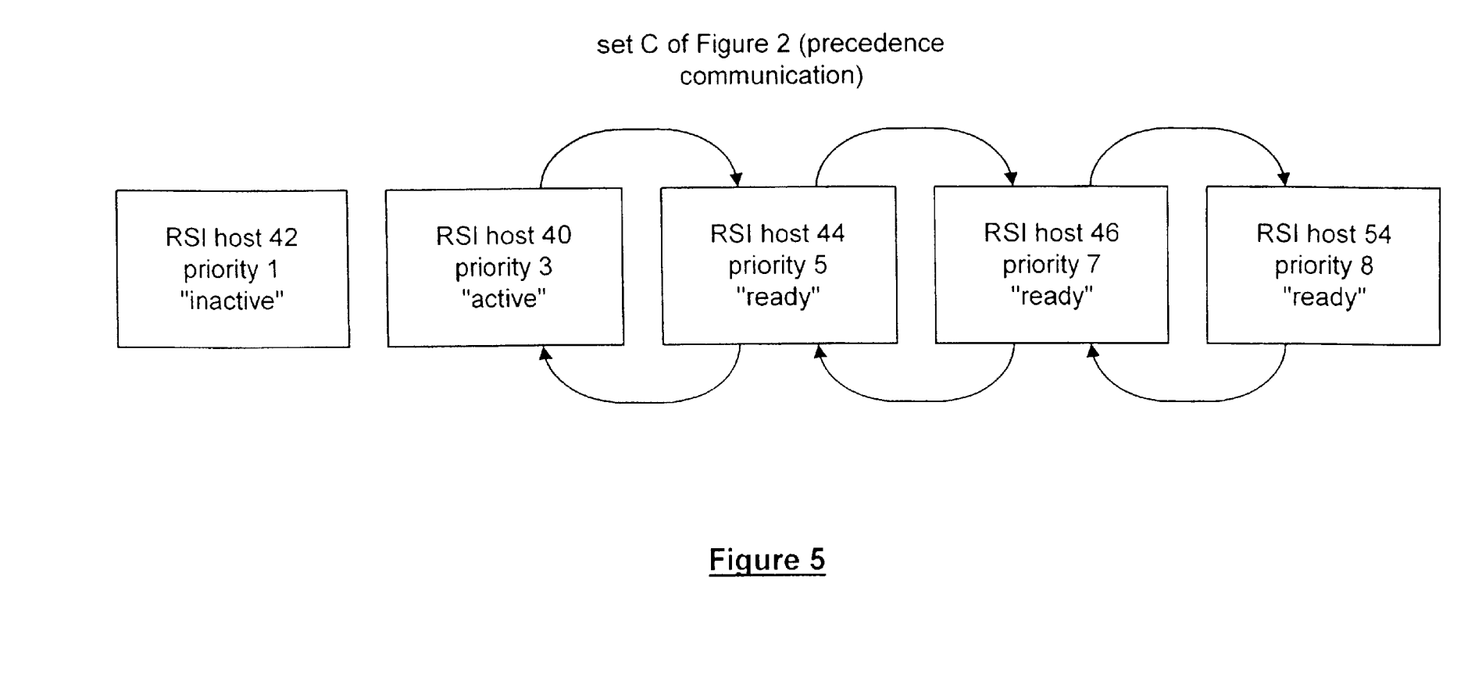
FIG. 5 illustrates a graphical representation of precedence communication among Routing Service Instance hosts in accordance with the present invention.

FIGS. 2–4 illustrate various configurations of RSI hosts 40–62 within the routing services, or the routing service control point (RSCP) 64, 66. In addition, the RSI hosts 40–62 are affiliated with one or more redundancy sets A, B, C, and D. Each of the RSI hosts 40–62 includes a priority value and an indication of its current state, with respect to the redundancy sets. As can be seen, an RSI host may be included in multiple redundancy sets, but once it is active, it does not participate in any of the other redundancy sets. In other words, the state of RSI host that is functioning as the Active RSI is inactive for other redundancy sets and when it is not active, it may be ready for multiple redundancy sets.

The redundancy sets of the FIGS. 2–4 and processes thereof, provide a redundancy model to detect that connectivity to the active RSI has failed, to provide a replacement RSI for the failed RSI, and to have the forwarders connect to the replacement RSI and the new active RSI.

To establish initial redundancy configuration, the forwarders and the RSI Hosts receive an ordered list of RSI Hosts participating in a given RSI's Redundancy Set from the CONS. The ordered list may be configured manually on each device. The RSI Hosts use the Redundancy Set as a starting point for determining their active neighbors for active RSI Host selection. The Forwarders use the Redundancy Set to determine which RSI Hosts the forwarder should attempt to connect to. A forwarder may use any arbitrary algorithm to traverse the list in searching for the active RSI Host as long as the Forwarder to RSI Host rules specified below are followed. (1) The RSI hosts use a Redundancy Chain Protocol (RCP) (which is running on RSCPs) to maintain one active RSI within a set of RSI Hosts. (2) The RCP uses a configured ordered set (Redundancy Set) of RSI Hosts along with neighbor notifications (Chain Updates) of RSI Host topology to select the RSCP to host the RSI (Self Determination Heuristic). (3) The Forwarders do not participate in the active RSI determination but they do use the same Redundancy Set to determine the set of RSI Hosts that the given forwarder should contact to find the RSI. (4) RSI Hosts use a hunt/hello protocol to create and maintain neighbor relationships. (5) RSI Hosts use redundancy set state notifications to converge into a topology where there is a single active RSI Host for the redundancy set.

The RSI Redundancy Set lists the RSI Hosts, in order of selection preference, that participate in the selection of one active RSI amongst them. The choice of the active RSI starts from the most preferred RSI Host in the redundancy set and is further based on the state of the RSI hosts. The RSI host states include:

| | |
|---|---|
| Active | This RSI Host is "the" active RSI Host (i.e., it is the RSI) of this ordered redundancy set. |
| Ready | This RSI Host is one of the spare RSI Host of this ordered redundancy set. |
| inactive | This RSI Host is temporarily not able to service this ordered redundancy set, most likely because the RSCP on which the RSI Host is running has an active RSI Host of another redundancy chain list for the same Realm. |

Furthermore, any given RSI Host may appear to other RSI Hosts in one of the following states:

| | |
|---|---|
| Unknown | The RSI Host does not yet know what the indicated (remote) RSI Host's state is. |
| Dead | The RSI Host believes that the indicated (remote) RSI Host is not reachable. |

RSI hosts exchange packets of information by transmitting chain updates to its adjacent neighbors for the following reasons: (1) In response to a configuration change from the CONS for the ordered redundancy set; (2) In response to a received Chain update from one of its adjacent neighbors; and (3) Chain update interval time-out. Note that a chain update message contains the states of all RSI Hosts in the Redundancy Set as currently known by the sending RSI Host. See FIG. 5 for an illustration of the precedence communication path between RSI hosts in a redundancy set.

When an RSI Host joins a redundancy set, the RSI Host initializes its copy of the Redundancy Set. As such, the RSI Hosts' states are set to unknown except for its own, which is set to Ready. This is the initial list that is sent out to its neighbors. Upon receipt of its neighbors' lists, the RSI Host builds up its own list. If the update comes from an upstream neighbor, then the RSI Host applies the changes for its upstream neighbors; vice versa if the update comes from downstream neighbor. At some point in time, the RSI Host uses the RSI Host Self Determination Heuristic (SDH) and sets its state based on the result. If the RSI Host's state changes as a result of the SDH, then the RSI Host updates its neighborhood (its copy of the RSI Hosts states) and notifies its immediate neighbors.

In order to ensure that the RSI Host topology converges, the Inverse split Horizon rule is observed. This rule states that in a Redundancy Set Update, the receiving RSI Host believes only part of the information contained in the Redundancy Set Update. The part that the RSI believes depends on from which neighbor the Redundancy Set Update was received. Specifically, on Redundancy Set Updates received from an upstream neighbor, the RSI Host only believes the information for RSI Hosts that are upstream from itself. In other words, the receiving RSI Host does not consider information about downstream RSI Hosts received from an Upstream Neighbor. This skepticism is symmetrical so, for Redundancy Set Updates received from a downstream RSI Host, the RSI Host information for upstream RSI hosts is not used.

Each RSI Host, when provided with the ordered redundancy set, will attempt to establish a connection to its adjacent neighbors. A glare condition is resolved by having the lower ordered RSI Host back down its connection setup. When the list changes, the RSI Host removes connections to RSI Hosts that are no longer its adjacent neighbors, and establish new connections to RSI Host that are now the adjacent neighbors.

The RSI Host Determination Heuristic determines the RSI Hosts' state based on the RSI Hosts current ability to become the RSI for the Redundancy set and the states of the RSI Host's neighbors. The SDH can be separated into three sections. The RSI Host's current state determines which section of the heuristic is used. For example:

Current State=inactive
   1. Do not change state.
Current State=Ready
   1. Is there an existing Active RSI Host in the chain. If yes, do not change state.
   2. Are there Ready RSI Hosts upstream. If yes, do not change state.
   3. RSI Host is to be the ACTIVE RSI Host. Change state to ACTIVE.
   4. Done.
Current State=Active
   1. Is there an existing ACTIVE RSI Host in the chain with a higher preference. If yes, change state to Ready.
   2. Done.

Figure 6A:
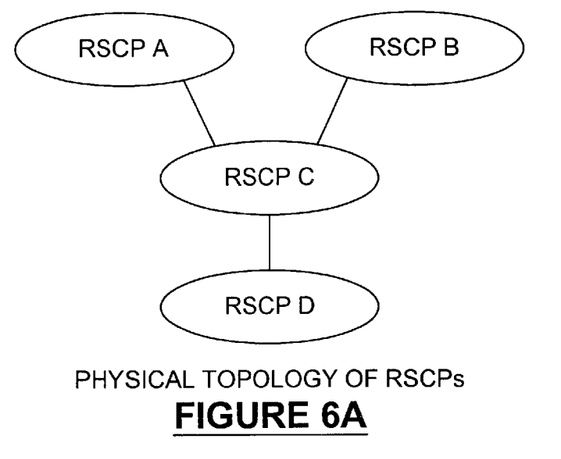
FIG. 6 illustrates the physical topology, logical topology, and topology partitioning of a routing server in accordance with the present invention.

FIG. 6A illustrates an example of the physical topology of an RSCP. In this example, the Realm consists of two active RSIs (RSI A and RSI B on RSCPs A and B respectively). The Realm has two RSCPs (RSCPs C and D) which may the host either RSI A or RSI B (from RSCPs A and B). The initial LRCP connections between the RSCPs are show as solid lines.

Figure 6B:
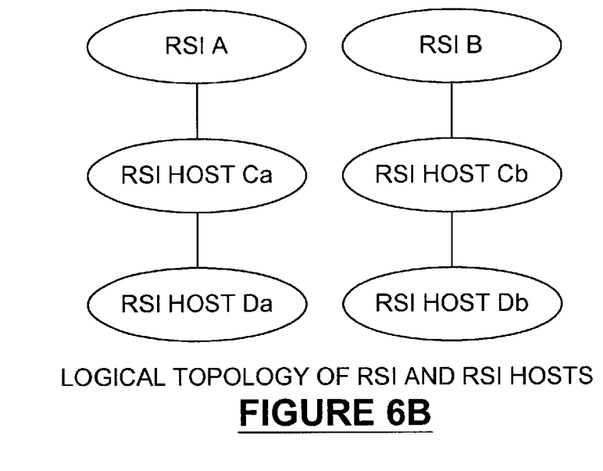

FIG. 6B illustrates the example of the logical topology of an RSI and the RSI hosts of the physical topology. As shown, there are two Redundancy Sets as there are two operational RSIs. RSCP C has two RSI Hosts, one for RSI A and the other for RSI B, which may be labeled as follows: RSI Host$_{Ca}$ and RSI Host$_{Cb}$. Likewise, RSCP D has two RSI Hosts called RSI Host$_{Da}$ and RSI Host$_{Db}$.

Table 2 shows the redundancy configuration for this Realm. The ordered redundancy set is ordered in descending preference for the active RSI Host. After initialized with the sets of ordered redundancy chain, the ordered chain {A, C, D} converges so that the states of these RSI Host for this redundancy set is {A: Active, C: Ready, D: Ready}, an the ordered chain list {B, C, D} converges to {B: Active, C: Ready, D: Ready}.

TABLE 2

Example: Redundancy Topological Configuration

| RSCP | RSI Host Id | Is Spare? | Ordered Redundancy Set | Adjacent Neighbors |
|---|---|---|---|---|
| RSCP A | RSI Host A$_a$ | no | {A$_a$, C$_a$, D$_a$} | C |
| RSCP B | RSI Host B$_b$ | no | {B$_b$, C$_b$, D$_b$} | C |
| RSCP C | RSI Host C$_a$ | yes | {A$_a$, C$_a$, D$_a$} | A, D |
|  | RSI Host C$_b$ | yes | {B$_b$, C$_b$, D$_b$} | B, D |
| RSCP D | RSI Host D$_a$ | yes | {A$_a$, C$_a$, D$_a$} | C |
|  | RSI Host D$_b$ | yes | {B$_b$, C$_b$, D$_b$} | C |

RSI Host$_{Bb}$ Fails First

The RSI Host for RSI B on RSCP B malfunctions and can not be reached. RSI Host C stops receiving cache updates from RSI Host B, and eventually concludes that RSI Host B is "dead". The next RSI Host on ordered redundancy set is RSI Host C itself, therefore it promotes its state to "active", and reports { B$_b$: dead, C$_b$: active, D$_b$: ready} to all its connected adjacent neighbors. RSCP C containing RSI Host C was also a spare in a different ordered redundancy set, so it must also update its adjacent neighbors with {A$_a$: active, C$_a$: inactive, D$_a$: ready}, thereby take itself out of running for that redundancy set temporarily.

Subsequently, RSI Host A Fails

When RSI Host A fails, RSI Host C$_a$ recognizes the topology change due to RSI Host A$_a$, and issues a chain update {A$_a$: Dead, C$_a$: inactive, D$_a$: Ready} to its adjacent neighbors. RSI Host D$_a$ receives an update from RSI Host C, and promotes its own state to active, follows by issuing an chain update of {A$_a$: Dead, C$_a$: inactive, D$_a$: Active} to its neighbors.

Figure 6C:
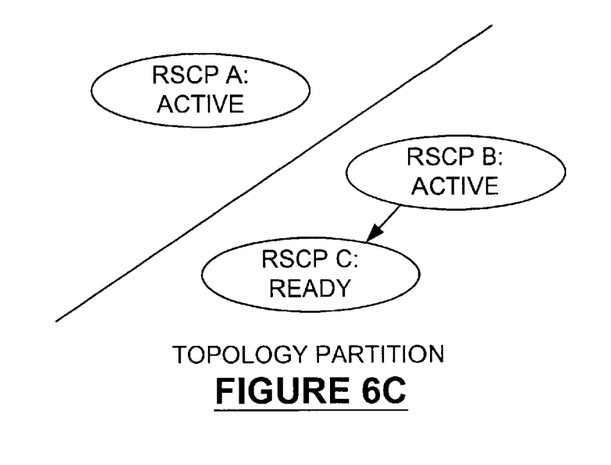

FIG. 6C illustrates a topology partition, where a partition of RSI Hosts in an ordered redundancy set may occur when there is a physical connection breakdown between adjacent neighbor RSI Hosts. When a partition occurs, one of the spare RSI Host in the partition that the active RSI is not a part of, will promote itself into the active RSI role. Taking an example of one ordered redundancy list {RSI Host A: active, RSI Host B: ready, RSI Host C: ready}; if there is a breakdown between RSI Host A and RSI Host B, then this incurs a partition as shown. Note that some of the Forwarders that were connected to the original active RSI on RSI Host A may remain connected to RSI Host A, but some may encounter the same connectivity problem as RSI Host B and switch to connect to RSI Host B as their active RSI. In a partitioned topology, only one of the multiple active RSI receives routing update through that Forwarder.

The partitioned topology may be healed, such that there is one and only one active RSI for an ordered redundancy set. Once a topology is partitioned, as illustrated in FIG. 6C, each active RSI believes the other to be "dead". To recover or to heal, the active RSI with lower preference in the redundancy set must periodically attempt to re-establish connection to those RSI Hosts in the lost partition. Once the connection has been re-established successfully, this RSI Host tears down its connection to all the Forwarders, and transition itself to a spare RSI Host again in "ready" state. The dropping of connections to the Forwarder forces the Forwarder to re-connect to the only active RSI in the topology now.

An interesting problem occurs when the underlying LRCP connectivity cannot be established as dictated by a "healthy" chain. Particularly, the following case is considered. RSI Hosts A,B,C,D are in the chain and are happy: A talks to B; B talks to A and C; C talks to B and D; D talks to C. At some point, B detects that it cannot talk to C and so switches to D. D in the meantime is happily chatting with C. B attempts to contact C (as its update from D indicate that C is available) but fails continually. In this case, after sufficient attempts to contact C, B will generate a management alarm.

Once the Forwarder has received its RSI Host target list (the Redundancy Set), it may begin to connect to the RSI Hosts. Initially, the Forwarder should treat the list as an ordered by preference list. The Forwarder should attempt to connect to the first RSI Host in the list. If LRCP level connectivity is not successful (e.g., the VC could not be set up), then the Forwarder selects the next RSI Host and tries it. This is repeated until a successful LRCP connection is established. If the forwarder goes through the entire list without a successful connection, it generates and alarm, and wraps to the beginning of the list.

Once the Forwarder connects to an RSI Host, the Forwarder sends an RSI Query Message. If the connected RSI Host is the active, it returns an RSI Ack Message. If the connected RSI Host is not the active, the RSI Host returns an RSI Nack Message with the currently active RSI Host's ATM address. If there is no currently active RSI Host, then the ATM address is coded as all zeros. If an RSI Nack message is received, then the Forwarder attempts to connect to the RSI Host specified in the RSI Nack Message. If there is no valid RSI Host in the RSI Nack Message, the Forwarder waits for a suitable amount of time and reconnects to the last RSI Host.

The RSI Host to RSI Host can be broken down into two separate components. First, is the RSI Host's interaction with its immediate neighbors. Second is the RSI Hosts determination of its own state. The neighbor interaction can be further broken down into two components. The first is the creation and maintenance of communication links between a given RSI Host and its immediate neighbors. The second being the exchange of messages to converge to a single active RSI Host for the Redundancy Set (possibly Redundancy Set fragment).

Figure 7:
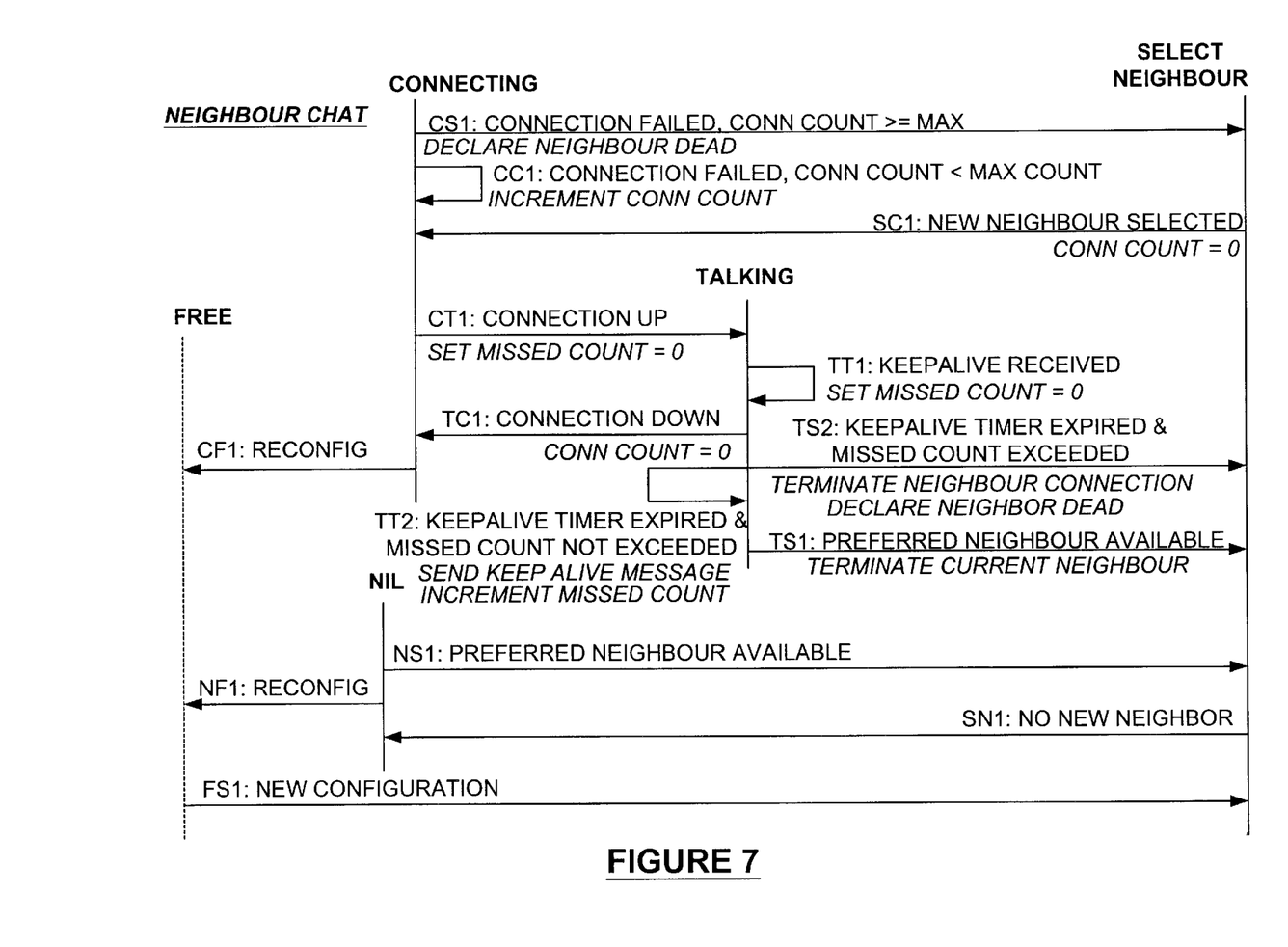
FIG. 7 illustrates a logic diagram for a routing server to communicate with a neighboring routing,server in accordance with the present invention.

The Neighbor Chat state machine Shown in FIG. 7 and is run by an RSI Host in two instances: once for the upstream neighbor and once for the downstream neighbor. Once in the talking state, an RSI Host uses a Redundancy Set Update message to maintain the connection and to propagate Redundancy Set State changes.

A Redundancy Set Update message contains the following information:
1. sender RSI Host ID (ATM address; realm id; redundancy set id)
2. sequence number
3. senders current view of the RSI Host redundancy chain list Keep-Alive messages are Redundancy Set messages sent periodically.

Figure 8:
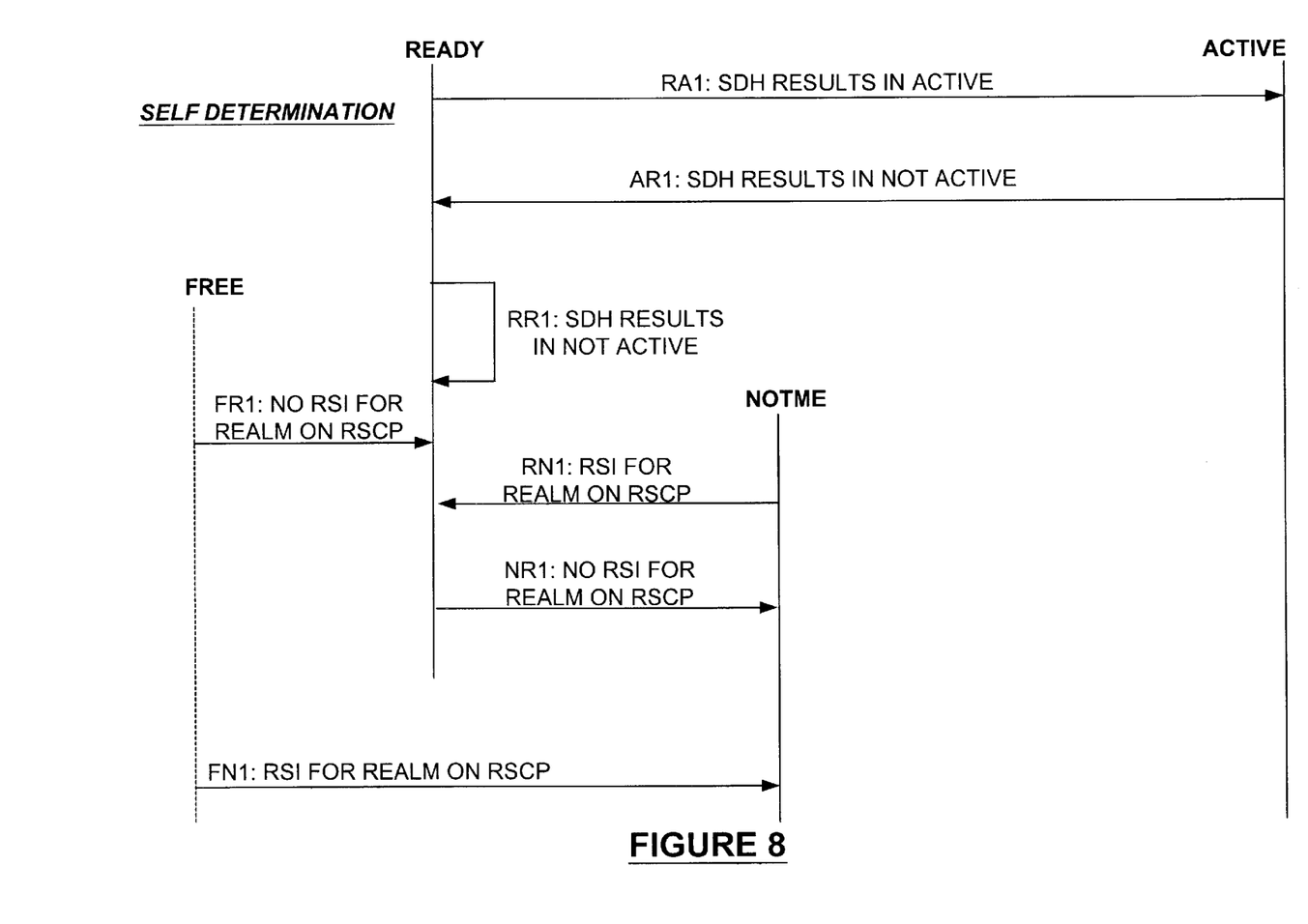
FIG. 8 illustrates a logic diagram for a routing server to perform a self determination in accordance with the present invention.

FIG. 8 illustrates a self state determination process executed by an RSI Host that includes a free state, a ready state, an active state, and a not me state. As shown, the state of the RSI Host depends on conditions within the realm and results for the self determination heuristic (SDN). Based on these conditions, the RSI Host is in one of the states shown.

The preceding discussion has presented a method and apparatus for providing greater flexibility, scalability and manageability when multiple services are being supported by a Carrier Scale Internetworking (CSI) system. By utilizing redundancy sets of Route Server Instance (RSI) hosts, when an active RSI host fails, CSI components and other RSI hosts readily determine a new RSI host. In addition, separation of the forwarding function from the routing function improves the CSI system's flexibility, scalability and manageability in that many of the CSI components only perform a forwarding function or a routing function. As one of average skill in the art will appreciate, other embodiments may be derived from the teachings of the present invention without deviating from the scope of the claims, or the spirit of the invention.

What is claimed is:

1. A Carrier Scale Internetworking (CSI) system that provides multiple services, the CSI system comprises:
    a plurality of routing service control points, wherein each of the plurality of routing service control points includes at least one routing service instance to provide routing information for a realm, wherein the realm is a specific instance of one of the multiple services, and wherein at least one of the plurality of routing service control points includes the at least one routing service instance of another one of the plurality of routing service control points for redundancy;
    a plurality of access terminations operable to provide user access to the CSI system;
    a plurality of edge forwarders each operably coupled to at least one of the plurality of access terminations, wherein each of the edge forwarders establish associations with at least one routing service instance on at least one routing service control point to forward data to a user associated with the realm;
    a default forwarder operably coupled to the plurality of edge forwarders, wherein the default forwarder receives packets for forwarding from at least one of the plurality of edge forwarders when the one of the plurality of edge forwarders is retrieving forwarding information;
    a configuration server that maintains state information for a plurality of clients and provides operational information to at least one client of the plurality of clients, wherein the plurality of clients include at least some of the routing service control points, at least some of the edge forwarders, and the default forwarder.

2. The CSI system of claim 1 further comprises a core forwarder operably coupled to at least some of the plurality of edge forwarders, wherein the core forwarder provide a forwarding path for at least one of the plurality of edge forwarders when the one of the plurality of edge forwarders cannot hold full forwarding databases.

3. The CSI system of claim 2, wherein the core forwarder is operably coupled to the routing service engine to receive routing service instance instructions that indicate which forwarding paths to establish and how packets are to be forwarded.

4. The CSI system of claim 1, wherein each of the routing service instances generate routing information for at least one of: a corresponding one of the plurality of edge forwarders and the default forwarder and provide the routing information to the at least one of the corresponding one of the plurality of edge forwarders and the default forwarder.

5. The CSI system of claim 4, wherein each of the routing service instances further function to exchange the routing information with other routing service instances inside the realm and outside the realm for maintaining routing control information or realm topology information.

6. The CSI system of claim 5, wherein the routing service instances are arranged into redundancy sets such that an active routing service instance is readily determinable by the CSI system for the realm by performing at least one of: a routing service host/one of the plurality edge forwarders or the default forwarder to the configuration server interaction, routing service instance host to routing service instance host interaction, and the one of the plurality edge forwarders or the default forwarder to the routing service instance host interaction.

7. The CSI system of claim 6, wherein the corresponding one of the plurality of edge forwarders and the default forwarder and the routing service instance host further function to establish an initial one of the redundancy sets utilizing an ordered list of routing service instance hosts, wherein the routing service instance host uses the ordered list to determine which of the adjacent neighbors are active, and wherein the corresponding one of the plurality of edge forwarders and the default forwarder uses the ordered list to determine which of the routing service instances hosts to connect to.

8. The CSI system of claim 1, wherein each of the plurality of edge forwarders further functions to perform preliminary authentication of users.

9. The CSI system of claim 1, wherein the configuration server further functions to update state information for each of the plurality of clients when any configuration changes occur, where the changes include addition, deletion, and/or failure of relevant corresponding one of the plurality of routing service control points.

10. The CSI system of claim 1, wherein the operational information comprises identity of a routing service instance to be running on a corresponding one of the plurality of routing service control points, identity of realms for which the routing service instances are responsible, routing service control points redundancy information, and the control interface information.

11. The CSI system of claim 1, wherein the default forwarder further functions to provide temporary support for the realm when the realm requires detailed per-flow-forwarding policy.

12. The CSI system of claim 1, wherein each of the plurality of edge forwarders establish the association with the at least one routing service instance based on the configuration information received from the configuration server and registering with the at least one routing service instance as a client.

13. The CSI system of claim 1, wherein one of the plurality of edge forwarders establishes connections with at least one other of the plurality of edge forwarders based on information contained in the routing service instance or to establish a direct shortcut connection.

14. The CSI system of claim 1, wherein at least one of the plurality of edge forwarders classifies packets according to the realm and quality of service, marks and manipulates packets, and provides differential policing and scheduling for flows based on instructions from a corresponding one of the plurality of routing service control points.

15. A method for providing multiple services on a Carrier Scale Internetworking (CSI) system, the method comprises the steps of:
   identifying at least one routing service instance of at least one of a plurality of routing service control points to provide routing for a realm, wherein the realm is a specific instance of one of the multiple services;
   establishing an association between one of a plurality of edge forwarders with at least one routing service instance on at least one routing service control point to forward data to a user associated with the realm;
   receiving, by a default forwarder, packets for forwarding from at least one of the plurality of edge forwarders when the one of the plurality of edge forwarders is retrieving forwarding information;
   maintaining state information for a plurality of clients, wherein the plurality of clients include at least some of the routing service control points, at least some of the edge forwarders, and the default forwarder; and
   providing operational information to at least one client of the plurality of clients.

16. The method of claim 15 further comprises providing a forwarding path for at least one of the plurality of edge forwarders when the one of the plurality of edge forwarders cannot hold full forwarding databases.

17. The method of claim 16 further comprises receiving routing service instance instructions that indicate which forwarding paths to establish and how packets are to be forwarded.

18. The method of claim 15 further comprises:
   generating routing information for at least one of: a corresponding one of the plurality of edge forwarders and the default forwarder; and
   providing the routing information to the at least one of the corresponding one of the plurality of edge forwarders and the default forwarder.

19. The method of claim 18 further comprises: exchanging the routing information between routing service instances inside the realm and outside the realm for maintaining routing control information or realm topology information, wherein the exchange is performed by transmitting chain updates to adjacent neighbors.

20. The method of claim 19 further comprises arranging the routing service instances into redundancy sets such that an active routing service instance is readily determinable by the CSI system for the realm by performing at least one of: a routing service host/one of the plurality edge forwarders or the default forwarder to the configuration server interaction, routing service instance host to routing service instance host interaction, and the one of the plurality edge forwarders or the default forwarder to the routing service instance host interaction.

21. The method of claim 20 further comprises establishing an initial one of the redundancy sets utilizing an ordered list of routing service instance hosts, wherein the routing service instance host uses the ordered list to determine which of the adjacent neighbors are active, and wherein the corresponding one of the plurality of edge forwarders and the default forwarder uses the ordered list to determine which of the routing service instances hosts to connect to.

22. The method of claim 15 further comprises updating state information for each of the plurality of clients when any configuration changes occur, where the changes include addition, deletion, and/or failure of relevant corresponding one of the plurality of routing service control points.

23. The method of claim 15 further comprises establishing connections between the plurality of edge forwarders based on configuration instructions or to establish a direct shortcut connection.

24. A Carrier Scale Internetworking (CSI) system that provides multiple services, the CSI system comprises:
   a processing module; and
   memory operably coupled to the processing module, wherein the memory stores operational instructions that cause the processing module to: (a) identify at least one routing service instance of at least one of a plurality of routing service control points to provide routing for a realm, wherein the realm is a specific instance of one of the multiple services; (b) establish an association between one of a plurality of edge forwarders with at least one routing service instance on at least one routing service control point to forward data to a user associated with the realm; (c) receive, as a default forwarder, packets for forwarding from at least one of the plurality of edge forwarders when the one of the plurality of edge forwarders is retrieving forwarding information; (d) maintain state information for a plurality of clients, wherein the plurality of clients include at least some of the routing service control points, at least some of the edge forwarders, and the default forwarder; and (e) provide operational information to at least one client of the plurality of clients.

25. The CSI system of claim 24, wherein the memory further comprises operational instructions that cause the processing module to provide a forwarding path for at least one of the plurality of edge forwarders when the one of the plurality of edge forwarders cannot hold full forwarding databases.

26. The CSI system of claim 25, wherein the memory further comprises operational instructions that cause the processing module to receive routing service instance instructions that indicate which forwarding paths to establish and how packets are to be forwarded.

27. The CSI system of claim 24, wherein the memory further comprises operational instructions that cause the processing module to:
   generate routing information for at least one of: a corresponding one of the plurality of edge forwarders and the default forwarder; and
   provide the routing information to the at least one of the corresponding one of the plurality of edge forwarders and the default forwarder.

28. The CSI system of claim 27, wherein the memory further comprises operational instructions that cause the processing module to: exchange the routing information between routing service instances inside the realm and outside the realm for maintaining routing control information or realm topology information, wherein the exchange is performed by transmitting chain updates to adjacent neighbors.

29. The CSI system of claim 28, wherein the memory further comprises operational instructions that cause the processing module to arrange the routing service instances into redundancy sets such that an active routing service instance is readily determinable by the CSI system for the realm by performing at least one of: a routing service host/one of the plurality edge forwarders or the default forwarder to the configuration server interaction, routing service instance host to routing service instance host interaction, and the one of the plurality edge forwarders or the default forwarder to the routing service instance host interaction.

30. The CSI system of claim 29, wherein the memory further comprises operational instructions that cause the processing module to establish an initial one of the redundancy sets utilizing an ordered list of routing service instance hosts, wherein the routing service instance host uses the ordered list to determine which of the adjacent neighbors are active, and wherein the corresponding one of the plurality of edge forwarders and the default forwarder uses the ordered list to determine which of the routing service instances hosts to connect to.

31. The CSI system of claim 24, wherein the memory further comprises operational instructions that cause the processing module to update state information for each of the plurality of clients when any configuration changes occur, where the changes include addition, deletion, and/or failure of relevant corresponding one of the plurality of routing service control points.

32. The CSI system of claim 24, wherein the memory further comprises operational instructions that cause the processing module to establish connections between the plurality of edge forwarders based on configuration instructions or to establish a direct shortcut connection.

* * * * *